US006583084B2

United States Patent
Hagihara et al.

(10) Patent No.: US 6,583,084 B2
(45) Date of Patent: Jun. 24, 2003

(54) CATALYST FOR STEAM REFORMING OF METHANOL AND METHOD FOR PRODUCING HYDROGEN THEREWITH

(75) Inventors: Konosuke Hagihara, Chiba (JP); Michiaki Umeno, Chiba (JP)

(73) Assignee: Mitsui Chemicals, Inc. (JP)

(*) Notice: Subject to any disclaimer, the term of this patent is extended or adjusted under 35 U.S.C. 154(b) by 0 days.

(21) Appl. No.: 09/902,689

(22) Filed: Jul. 12, 2001

(65) Prior Publication Data

US 2002/0039965 A1 Apr. 4, 2002

(30) Foreign Application Priority Data

Jul. 18, 2000 (JP) ........................ 2000-217509

(51) Int. Cl.[7] ............. B01J 23/60; B01J 23/72; B01J 23/42; B01J 23/44
(52) U.S. Cl. ............... 502/329; 502/331; 502/339
(58) Field of Search ................... 502/329, 331, 502/339

(56) References Cited

U.S. PATENT DOCUMENTS 4,913,842 A * 4/1990 Yoneoka et al. ............ 252/373
6,051,163 A * 4/2000 Kumberger et al. ........ 252/373

FOREIGN PATENT DOCUMENTS

| JP | 57-7255 | 1/1982 |
| JP | 57-56302 | 4/1982 |
| JP | 60-209225 | 10/1985 |
| JP | 7-116517 | 5/1995 |
| JP | 7-265704 | 10/1995 |
| JP | 8-215571 | 8/1996 |
| JP | 8-215576 | 8/1996 |
| JP | 10-309466 | 11/1998 |

* cited by examiner

Primary Examiner—Mark L. Bell
Assistant Examiner—Patricia L. Hailey
(74) Attorney, Agent, or Firm—Burns, Doane, Swecker & Mathis, L.L.P.

(57) ABSTRACT

The object of the present invention is to provide a new catalyst for steam reforming of methanol which can provide both sufficient catalyst activity and durability and additionally an efficient method for producing hydrogen with the catalyst, and for that purpose there is provided a catalyst for steam reforming of methanol, characterized by comprising copper and zinc, and palladium and/or platinum, and in that an atomic ratio of copper to palladium and/or platinum is 0.5 to 10 and an atomic ratio of zinc to copper is 0.1 to 10, and a method for producing hydrogen, characterized in that methanol is subjected to steam reforming in the presence of the catalyst.

12 Claims, 1 Drawing Sheet

US 6,583,084 B2

CATALYST FOR STEAM REFORMING OF METHANOL AND METHOD FOR PRODUCING HYDROGEN THEREWITH

BACKGROUND OF THE INVENTION (1) Field of the Invention

The present invention relates to a catalyst for steam reforming of methanol which can be used to obtain hydrogen by decomposing methanol in the presence of steam, and to a method for producing hydrogen with the catalyst.

(2) Description of the Prior Art

Conventionally, there have been proposed, as catalysts for steam reforming of methanol, a number of catalysts having platinum or palladium supported on carriers such as alumina, or alternatively having a carried base metal like copper, nickel, chromium, zinc, or the like.

In general, it is commonly known that catalysts formed of element(s) of the copper group have excellent activity and selectivity ("Shokubai Koza (Catalysis Course), vol. 9," edited by the Catalysis Society of Japan (published on May 10, 1985), Kodansha Ltd., pp. 132–134). On the other hand, it is believed that these catalysts formed of element(s) of the copper group, although they are excellent in activities, have problems in terms of heat stability.

Catalysts formed of copper compounds further containing palladium or platinum element are known, for example, there are disclosed catalysts having zinc, chromium, as a major component, and containing any one of copper, cobalt, platinum, palladium, rhodium, nickel, manganese, magnesium, and molybdenum (Japanese Patent Laid-Open No. 57-56302).

In addition, with respect to catalysts having a small deterioration of activity at elevated temperatures and showing a high catalytic activity, there are known methods in which the activity can be improved by supporting one or more metals from the group consisting of copper, zinc, chromium, and nickel and one or more metals from the group consisting of platinum and palladium on a carrier, alumina pre-coated with zirconia (Japanese Patent Laid-Open No. 57-7255).

As methods for preparing catalysts with superior activity and stability, there are known methods of preparing catalysts containing at least one metal of copper, zinc, aluminum and rare metals, and zirconium and further containing at least one metal selected from palladium, silver, rhenium and platinum (Japanese Patent Laid-Open No. 60-209255).

Furthermore, with respect to catalysts having high durability, there are known ones composed of metal oxide having, as essential components, copper oxide, zinc oxide, aluminum oxide, and silicon oxide, which may contain zirconium oxide, gallium oxide, palladium oxide as an optional component (Japanese Patent Laid-Open No. 10-309466).

As described above, although there are many known catalysts containing copper and platinum, and palladium, such catalysts are limited to ones having a range of relatively high atomic ratios of copper to platinum, palladium.

As general methods for preparing copper-based catalysts, kneading, coprecipitating, Cu plating, Cu spray coating methods, and the like are known, which methods have limitations on the minimum particle size of the catalysts. As catalysts displaying superior activity and durability, alloy-based catalysts of ultrafine particles are disclosed (Japanese Patent Laid-Open Nos. 07-116517, 07-265704, 08-215571, and 08-215576).

However, in all of the known methods mentioned above, it is at the actual circumstance that there exists no method having sufficient properties in terms of both activity and durability.

SUMMARY OF THE INVENTION

The present invention is intended to solve the disadvantages of catalysts hitherto known, thereby providing a new catalyst for steam reforming of methanol which can provide both sufficient catalyst activity and durability, and further providing an efficient method for producing hydrogen with the catalyst.

The inventors have conducted extensive research to solve the above-mentioned problems. In consequent, the inventor have found that the improvement in not only durability but also catalyst activity can be obtained surprisingly by adding palladium and/or platinum element(s), which have conventionally displayed an extremely low activity when used alone, to copper- and zinc-based catalysts in large amounts. On the basis of such findings, the present invention has been made.

The present invention is specified by the followings.

[1] A catalyst for steam reforming of methanol, characterized by comprising copper and zinc, and palladium and/or platinum, and in that an atomic ratio of copper to palladium and/or platinum is 0.5 to 10 and an atomic ratio of zinc to copper is 0.1 to 10.

[2] The catalyst for steam reforming of methanol according to [1], characterized in that the catalyst comprises palladium and/or platinum and the atomic ratio of copper to palladium and/or platinum is 0.5 to 5.

[3] The catalyst for steam reforming of methanol according to [1], characterized in that the catalyst comprises palladium and/or platinum and the atomic ratio of copper to palladium and/or platinum is 0.5 to 3.

[4] The catalyst for steam reforming of methanol according to any one of [1] to [3], characterized in that a catalyst comprising copper and zinc, and palladium and/or platinum is prepared by a coprecipitation method and subjected to calcining at 200° C. to 470° C.

[5] A method for producing hydrogen, characterized in that methanol is subjected to steam reforming in the presence of the catalyst according to any one of [1] to [4].

DETAILED DESCRIPTION OF PREFERRED EMBODIMENTS

Figure 1:
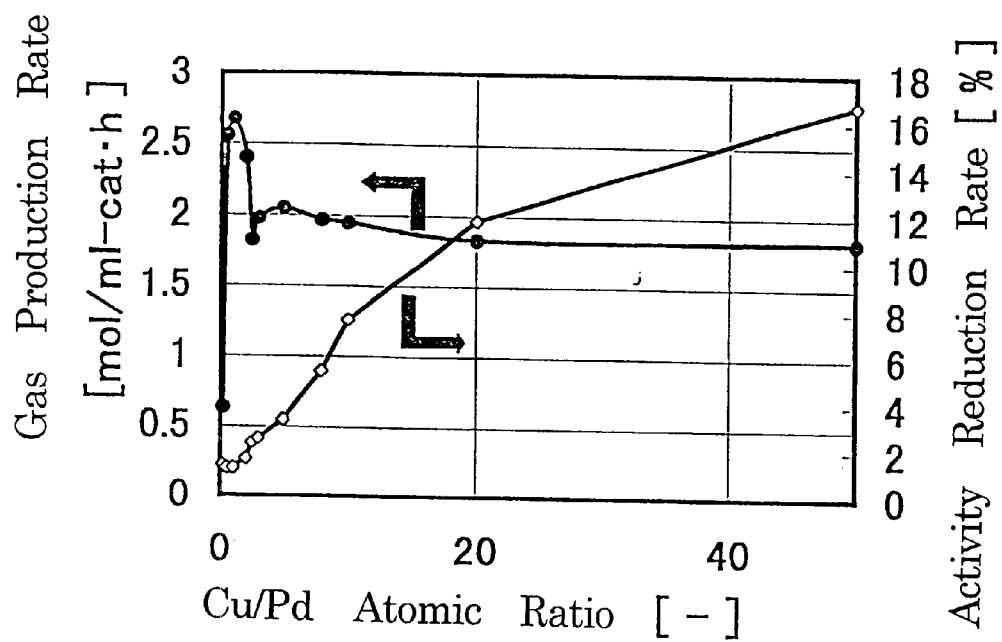
FIG. 1 shows a relation of Cu/Pd atomic ratio to activity reduction rate and gas production rate.

Catalysts for steam reforming of methanol in the present invention are those comprising, as essential components, zinc, and palladium and/or platinum in addition to copper. In these catalysts, an atomic ratio of copper to palladium or platinum is in the range of 0.5 to 10. In the case of only palladium and/or platinum, the durability will be improved, whereas the activity is extremely low. In the case of only copper and zinc, the activity is high, but the durability is extremely low. In the present invention, when the atomic ratio of copper to palladium and/or platinum element(s) is 0.1 to 10, it has been surprisingly formed that the activity and durability are extremely high. The catalyst activity will be decreased, when the atomic ratio of copper to palladium and/or platinum element(s) is less than 0.1. The durability will be decreased at atomic ratios of more than 10. The atomic ratio is preferably in the range of 0.5 to 5, and preferably in particular in the range of 0.5 to 3. When catalysts are formed having compositions in which both palladium and platinum are contained, the atomic ratio of copper to the sum of these elements can be in the range of 0.1 to 10, and more preferably in the range of preferably 0.5 to 5. Further preferably, the atomic ratio is in the range of 0.5 to 3.

In addition, in the case of the catalysts for steam reforming of methanol in the present invention, it is necessary to have compositions in which zinc is also contained, because the catalytic activity is increased to a higher extent. The content of zinc is in such a range that the atomic ratio of zinc/copper is 0.1 to 10, and preferably 0.2 to 4. Furthermore, as far as the purpose of the present invention is not impaired, compositions containg other oxides can be possible.

It is possible to prepare the catalysts in the present invention by wet processes. For example, the catalysts can be prepared by general methods as described in "Shokubai Koza (Catalysis Course), vol. 5," edited by the Catalysis Society of Japan (published on Nov. 1, 1986), Kodansha Ltd. If copper and zinc substances are prepared by known methods, followed by carrying palladium or platinum by impregnation and others, then sufficient activity and durability cannot be obtained, and such processing is not preferable.

When producing the catalysts by coprecipitation in the present invention, one can employ methods by which a metal salt solution is mixed with a basic carbonate or bicarbonate salt solution in a pH range of 6 to 9 and in a temperature range of room temperature to about 80° C., and the deposited coprecipitates (catalyst precursor) are washed in a temperature range of room temperature to about 50° C., filtered at room temperature, dried in a temperature range of about 100 to 160° C., and subjected to burning.

The burning temperature of the catalysts is preferably at low temperatures, and calcining is preferably carried out in the range of about 200° C. to 470° C. In the case of calcining at higher temperatures, the catalysts will be sintered, resulting in a decrease in activity. Therefore, calcining at temperatures of 470° C. or higher are not preferable. At temperatures lower than 100° C., on the other hand, the catalyst precursor prepared by coprecipitation is decomposed insufficiently, and desired levels of the activity cannot be achieved.

It is preferable that the catalysts obtained by the above-described processes are subjected to hydrogen treatment in a liquid or gas phase, and employed in reactions.

Furthermore, the steam reforming catalysts of the present invention, after prepared by the above-described processes, can be not only employed as formed catalysts by means of subsequent tablet molding or extrusion, but also formed into honeycomb in which they are carried on ceramics carriers such as mullite and cordierite, silica cloth, spongy metal-sintered porous plates, and the like.

Methods for producing hydrogen in the present invention are performed in the presence of the above described catalyst preferably in the manner allowing the catalyst in contact with methanol and water (steam). In this case, reaction conditions for methanol reforming are preferably a reaction temperature of 150 to 600° C. and preferably a reaction pressure of not more than 50 kg/cm$^2$G, preferably in particular a reaction pressure of 30 kg/cm$^2$G to normal pressure. The ratio of water to methanol is preferably in the range of 0.5 to 30 mole water per mole of methanol. The space velocity of a mixed vapor of methanol and water is preferably in the range of 50 to 50,000 hr$^{-1}$, and preferably in particular in the range of 100 to 15,000 hr$^{-1}$. The reaction can be also carried out with adding optional hydrogen gas, carbon monoxide gas, carbon dioxide gas, nitrogen, air, and others.

The reactions for producing hydrogen in the present invention can be performed by contacting the catalyst with methanol and water as described above, and are not of types having limitations, particularly on apparatus scales and others. For the mode of its contacting with the catalyst, any reaction manner hitherto known can be employed, such as fixed and fluidized bed manners.

The following will further explains the present invention by reference to Examples and Comparative Examples, and Testing Examples of the catalyst activity, which put no limitation at all on the scope of the present invention. In the following, all the percentages are on a mass basis.

1) Catalyst Preparation

EXAMPLE 1

An aqueous solution was prepared by dissolving 28.3 g of 10% aqueous solution of palladium nitrate [Pd(NO$_3$)$_2$], 1.49 g of copper nitrate trihydrate [Cu(NO$_3$)$_2$·3H$_2$O], and 10.06 g of zinc nitrate hexahydrate [Zn(NO$_3$)$_2$·6H$_2$O] into 200 ml of pure water. Next, to this solution was added 1N sodium carbonate [Na$_2$CO$_3$] at room temperature with stirring and mixing until the solution reached a pH of 6.6 to 6.8. The formed slurry was stirred for 150 minutes, and then the formed precipitates were filtered under reduced pressure and washed thoroughly with distilled water. After that, the filtered precipitates were dried in an oven at 80° C. for 12 hours, and then subjected to calcining in an electric furnace at 350° C. for 3 hours in the air. The resulting oxide was subjected to tablet molding and crushed, and a 1 ml aliquot was removed. The aliquot was filled into a small reaction tube and subjected to reduction treatment using a mixed gas of H$_2$/N$_2$=1/9 at GHSV=6000 [hr$^{-1}$] to obtain a catalyst.

EXAMPLE 2

A catalyst was prepared in a similar way to that of Example 1, except that 22.8 g of 10% aqueous solution of palladium nitrate and 2.39 g of copper nitrate trihydrate were added so as to achieve a copper/palladium atomic ratio=1 in Example 1.

EXAMPLE 3

A catalyst was prepared in a similar way to that of Example 1, except that 16.3 g of 10% aqueous solution of palladium nitrate and 3.43 g of copper nitrate trihydrate were added so as to achieve a copper/palladium atomic ratio=2 in Example 1.

EXAMPLE 4

A catalyst was prepared in a similar way to that of Example 1, except that 14.3 g of 10% aqueous solution of palladium nitrate and 3.76 g of copper nitrate trihydrate were added so as to achieve a copper/palladium atomic ratio=2.5 in Example 1.

EXAMPLE 5

A catalyst was prepared in a similar way to that of Example 1, except that 12.7 g of 10% aqueous solution of palladium nitrate and 4.01 g of copper nitrate trihydrate were added so as to achieve a copper/palladium atomic ratio=3 in Example 1.

EXAMPLE 6

A catalyst was prepared in a similar way to that of Example 1, except that 8.8 g of 10% aqueous solution of palladium nitrate and 4.64 g of copper nitrate trihydrate were added so as to achieve a copper/palladium atomic ratio=5 in Example 1.

EXAMPLE 7

A catalyst was prepared in a similar way to that of Example 1, except that 6.1 g of 10% aqueous solution of palladium nitrate and 5.09 g of copper nitrate trihydrate were added so as to achieve a copper/palladium atomic ratio=8 in Example 1.

EXAMPLE 8

A catalyst was prepared in a similar way to that of Example 1, except that 5.01 g of 10% aqueous solution of palladium nitrate and 5.26 g of copper nitrate trihydrate were added so as to achieve a copper/palladium atomic ratio=10 in Example 1.

EXAMPLE 9

The copper/platinum atomic ratio=2.5 was achieved by adding 2.53 g of chloroplatinic acid hexahydrate, instead of 10% aqueous solution of palladium nitrate, and adding 2.95 g of copper nitrate trihydrate in Example 1. These chemicals were dissolved in 200 ml of pure water to prepare an aqueous solution, to which aqueous ammonia was added at room temperature with stirring and mixing until the solution reached a pH of 6.6 to 6.8. The other procedures were the same as in Example 1 to prepare a catalyst.

EXAMPLE 10

The copper/platinum atomic ratio=3 was achieved by adding 2.30 g of chloroplatinic acid hexahydrate, instead of 10% aqueous solution of palladium nitrate, and adding 3.22 g of copper nitrate trilhydrate in Example 1. These chemicals were dissolved in 200 ml of pure water to prepare an aqueous solution, to which aqueous ammonia was added at room temperature with stirring and mixing until the solution reached a pH of 6.6 to 6.8. The other procedures were the same as in Example 1 to prepare a catalyst.

EXAMPLE 11

The copper/platinum atomic ratio=5 was achieved by adding 1.70 g of chloroplatinic acid hexahydrate, instead of 10% aqueous solution of palladium nitrate, and adding 3.97 g of copper nitrate trihydrate in Example 1. These chemicals were dissolved in 200 ml of pure water to prepare an aqueous solution, to which aqueous ammonia was added at room temperature with stirring and mixing until the solution reached a pH of 6.6 to 6.8. The other procedures were the same as in Example 1 to prepare a catalyst.

EXAMPLE 12

A catalyst prepared in a similar way to that of Example 5 was subjected to calcining in an electric oven at 400° C. for 3 hours in the air. The other procedures were the same as in Example 1 to prepare a catalyst.

EXAMPLE 13

A catalyst prepared in a similar way to that of Example 5 was subjected to calcining in an electric oven at 470° C. for 3 hours in the air. The other procedures were the same as in Example 1 to prepare a catalyst.

EXAMPLE 14

A catalyst prepared in a similar way to that of Example 5 was subjected to calcining in an electric oven at 500° C. for 3 hours in the air. The other procedures were the same as in Example 1 to prepare a catalyst.

EXAMPLE 15

A catalyst prepared in a similar way to that of Example 5 was subjected to calcining in an electric oven at 600° C. for 3 hours in the air. The other procedures were the same as in Example 1 to prepare a catalyst.

Comparative Example 1

A catalyst was prepared in a similar way to that of Example 1, except that 10% aqueous solution of palladium nitrate was not added and 6.07 g of copper nitrate trihydrate was added in Example 1.

Comparative Example 2

A catalyst was prepared in a similar way to that of Example 1, except that 2.69 g of 10% aqueous solution of palladium nitrate and 5.64 g of copper nitrate trihydrate were added so as to achieve a copper/palladium ratio=20 in Example 1.

Comparative Example 3

A catalyst was prepared in a similar way to that of Example 1, except that 1.1 g of 10% aqueous solution of palladium nitrate and 5.89 g of copper nitrate trihydrate were added so as to achieve a copper/palladium ratio=50 in Example 1.

Comparative Example 4

A catalyst was prepared in a similar way to that of Example 1, except that 33.3 g of 10% aqueous solution of palladium nitrate and 0.70 g of copper nitrate trihydrate were added so as to achieve a copper/palladium ratio=0.2 in Example 1.

2) Activity Testing

Copper/palladium catalysts and copper/platinum catalysts prepared in the above-described procedures were measured for the activity of the steam reforming reaction of methanol. As the starting material was employed 54.2% by weight of aqueous methanol solution ($H_2O/CH_3OH=1.5$(mol/mol)), and the reaction was carried out under the following conditions: a reaction temperature of 250° C., normal pressure, and a feeding velocity of the aqueous methanol solution as the starting material of 60(L-solv/L-cat·h) relative to the unit amount of the catalyst. The amount of a mixed gas of hydrogen and carbon dioxide formed by the reaction was measured, and the activity reduction rate was calculated from the activity reduction rate at the initial stage of the reaction and at 48 hours after starting the reaction. The obtained results of the activity testing are shown in Table 1 and FIG. 1.

TABLE 1

|  | Cu/Pd atomic ratio | Cu/Pt atomic ratio | Gas production rate (mol/ml-cat · h) | Activity reduction rate (%) | Calcining temperature (° C.) |
| --- | --- | --- | --- | --- | --- |
| Example 1 | 0.5 |  | 2.56 | 1.2 |  |
| Example 2 | 1 |  | 2.68 | 1.2 |  |
| Example 3 | 2 |  | 2.41 | 1.6 |  |
| Example 4 | 2.5 |  | 1.82 | 2.3 |  |
| Example 5 | 3 |  | 1.98 | 2.5 |  |
| Example 6 | 5 |  | 2.05 | 3.3 |  |
| Example 7 | 8 |  | 1.97 | 5.4 |  |

TABLE 1-continued

| | Cu/Pd atomic ratio | Cu/Pt atomic ratio | Gas production rate (mol/ml-cat · h) | Activity reduction rate (%) | Calcining temperature (° C.) |
|---|---|---|---|---|---|
| Example 8 | 10 | | 1.95 | 7.6 | |
| Example 9 | | 2.5 | 1.81 | 3.2 | |
| Example 10 | | 3 | 1.86 | 3.5 | |
| Example 11 | | 5 | 1.96 | 4.7 | |
| Example 12 | 3 | | 1.94 | 2.5 | 400° C. |
| Example 13 | 3 | | 1.93 | 2.5 | 470° C. |
| Example 14 | 3 | | 1.88 | 2.4 | 500° C. |
| Example 15 | 3 | | 1.58 | 2.4 | 600° C. |
| Comparative Example 1 | — | | 1.8 | 18.8 | |
| Comparative Example 2 | 20 | | 1.83 | 11.8 | |
| Comparative Example 3 | 50 | | 1.83 | 16.8 | |
| Comparative Example 4 | 0.2 | | 0.63 | 1.3 | |

As indicated obviously by the catalysts given in the above-described Examples and Comparative Examples, and from the results of the activity testing of the catalysts, it has been found that the catalysts of the present invention have sufficiently superior properties in terms of not only activity but also durability.

In addition, according to the method for producing hydrogen of the present invention, it is possible to produce hydrogen efficiently for a long period by employing the above-described catalyst of the present invention.

What is claimed is:

1. A catalyst for steam reforming of methanol, comprising copper and zinc, and palladium and/or platinum, and in that an atomic ratio of copper to palladium and/or platinum is 0.5 to 10 and an atomic ratio of zinc to copper is 0.1 to 10.

2. The catalyst for steam reforming of methanol according to claim 1, characterized in that the catalyst comprises palladium and/or platinum and the atomic ratio of copper to palladium and/or platinum is 0.5 to 5.

3. The catalyst for steam reforming of methanol according to claim 1, characterized in that the catalyst comprises palladium and/or platinum and the atomic ratio of copper to palladium and/or platinum is 0.5 to 3.

4. The catalyst for steam reforming of methanol according to claim 3, characterized in that a catalyst comprising copper and zinc, and palladium and/or platinum is prepared by a coprecipitation method and subjected to calcining at 200° to 470° C.

5. A method for producing hydrogen, characterized in that methanol is subjected to steam reforming in the presence of the catalyst according to claim 3.

6. A method for producing hydrogen, characterized in that methanol is subjected to steam reforming in the presence of the catalyst according to claim 4.

7. The catalyst for steam reforming of methanol according to claim 2, characterized in that a catalyst comprising copper and zinc, and palladium and/or platinum is prepared by a coprecipitation method and subjected to calcining at 200° to 470° C.

8. A method for producing hydrogen, characterized in that methanol is subjected to steam reforming in the presence of the catalyst according to claim 7.

9. The catalyst for steam reforming of methanol according to claim 1, characterized in that a catalyst comprising copper and zinc, and palladium and/or platinum is prepared by a coprecipitation method and subjected to calcining at 200° to 470° C.

10. A method for producing hydrogen, characterized in that methanol is subjected to steam reforming in the presence of the catalyst according to claim 9.

11. A method for producing hydrogen, characterized in that methanol is subjected to steam reforming in the presence of the catalyst according to claim 2.

12. A method for producing hydrogen, characterized in that methanol is subjected to steam reforming in the presence of the catalyst according to claim 1.

* * * * *